US011422286B2

(12) United States Patent
Kim et al.

(10) Patent No.: US 11,422,286 B2
(45) Date of Patent: Aug. 23, 2022

(54) METHOD FOR PRECIPITATION NOWCASTING USING DYNAMIC MOTION VECTORS, RECORDING MEDIUM AND DEVICE FOR PERFORMING THE METHOD

(71) Applicant: KOREA METEOROLOGICAL ADMINISTRATION, Seoul (KR)

(72) Inventors: Kwang-Ho Kim, Anyang-si (KR); Youn Choi, Seoul (KR); Sung-Hwa Jung, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 0 days.

(21) Appl. No.: 17/350,642

(22) Filed: Jun. 17, 2021

(65) Prior Publication Data

US 2022/0018991 A1 Jan. 20, 2022

(30) Foreign Application Priority Data

Jul. 15, 2020 (KR) .................. 10-2020-0087759

(51) Int. Cl.
*G01W 1/10* (2006.01)
*G01S 13/95* (2006.01)
*G01W 1/14* (2006.01)

(52) U.S. Cl.
CPC ............. *G01W 1/10* (2013.01); *G01S 13/95* (2013.01); *G01W 1/14* (2013.01); *G01W 2203/00* (2013.01)

(58) Field of Classification Search
CPC .................. G01W 1/10; G01S 13/95
(Continued)

(56) References Cited

U.S. PATENT DOCUMENTS 11,169,263 B2 * 11/2021 Tang ..................... G06N 3/0445
2007/0005249 A1 * 1/2007 Dupree ................... G01S 13/89
702/3

(Continued)

FOREIGN PATENT DOCUMENTS

JP 2000-187082 A 7/2000
JP 2010-060444 A 3/2010
(Continued)

OTHER PUBLICATIONS

Bellon, A., Zawadzki I., Kilambi A., Lee H. C., Lee Y. H., and Lee G. "McGil algorithm for precipitation nowcastingm by lagrangian extrapolation (MAPLE) applied to the South Korean radar network. Part I : sensitivity studies of the variational echo tracking (VET) technique" Asia-Pacific J. Atmos. Sci., 46(3), 369-381 (2010).

(Continued)

*Primary Examiner* — Ricky Go
(74) *Attorney, Agent, or Firm* — Novick, Kim & Lee, PLLC; Sang Ho Lee; Hyun Woo Shin

(57) ABSTRACT

A precipitation nowcasting method using dynamic motion vectors includes calculating a multiscale motion vector of a radar precipitation motion vector and a numerical model precipitation motion vector by changing spatial scale of cross correlation analysis for reach of a preset time interval from precipitation data obtained through a dual polarization radar, calculating a dynamic motion vector by merging the radar precipitation motion vector and the numerical model precipitation motion vector, generating a precipitation development and dissipation map through precipitation tracking and matching using the dynamic motion vector, and outputting a precipitation forecast field for each forecast time by applying the dynamic motion vector and the precipitation development and dissipation map to Lagrangian (Continued)

backward extrapolation. Accordingly, it is possible to achieve realistic precipitation forecast field simulation.

11 Claims, 7 Drawing Sheets

(58) Field of Classification Search
USPC ............................................................ 702/3
See application file for complete search history.

(56) References Cited

U.S. PATENT DOCUMENTS

| | | | | |
|---|---|---|---|---|
| 2007/0118290 | A1* | 5/2007 | Bieringer | G01S 13/951 |
| | | | | 702/3 |
| 2008/0097701 | A1* | 4/2008 | Zawadzki | G01W 1/10 |
| | | | | 702/3 |
| 2020/0132884 | A1* | 4/2020 | Rothenberg | G06N 7/005 |

FOREIGN PATENT DOCUMENTS

| | | |
|---|---|---|
| KR | 10-1871315 B | 6/2018 |
| KR | 10-2018-0083054 A | 7/2018 |
| KR | 10-1968413 B | 4/2019 |
| KR | 10-2006847 B1 | 8/2019 |

OTHER PUBLICATIONS

Germann, U., and L. Zawadzki. "Scale-Dependence of the Predictability of Precipitation from Continental Radar Images. Part I : Description of the Methodology". Mon. Wea. Rev.,vol. 130, pp. 2859-2873 (Dec. 2002).

* cited by examiner

METHOD FOR PRECIPITATION NOWCASTING USING DYNAMIC MOTION VECTORS, RECORDING MEDIUM AND DEVICE FOR PERFORMING THE METHOD

CROSS-REFERENCE TO RELATED APPLICATIONS

This application claims priority under 35 U.S.C. § 119 to Korean Patent Application No. 10-2020-0087759, filed on Jul. 15, 2020, in the Korean Intellectual Property Office, the disclosure of which is incorporated herein by reference in its entirety.

TECHNICAL FIELD

The present disclosure relates to a method for precipitation nowcasting using dynamic motion vectors and a recording medium and a device for performing the same, and more particularly, to technology for realistic precipitation forecast field simulation by calculating dynamic motion vectors that change depending on the forecast time and using them to generate a precipitation development and dissipation map.

BACKGROUND

The precipitation nowcasting technique may be classified into cell based forecasting technique and precipitation area based forecasting technique. The cell based forecasting technique detects and tracks convective cells, calculates motion vectors (speed and direction) of the convective cells, and predicts the future cell positions based on the motion vectors of the convective cells.

For detection and tracking of the convective cells, the Hungarian method, the overlapping method and the fuzzy logic method are used. A typical cell based forecasting technique includes Thunderstorm Identification, Tracking Analysis, Nowcasting (TITAN, Dixon and Wiener 1993), Storm Cell Identification and Tracking (SCIT, Johnson et al., 1998), Fuzzy Algorithm Storm Tracking (FAST, Jung et al. 2015).

The area based forecasting technique calculates motion vectors of precipitation fields in all 2-dimensional grids, and calculates future precipitation forecast fields based on the motion vectors of the precipitation fields. This technique uses cross correlation analysis, calculus of variations, and an optical flow method to calculate motion vector fields.

A typical area based forecasting technique includes Tracing Radar Echoes by correlation (TREC) (Tanelli et al. 1999), McGil algorithm for precipitation nowcasting by Lagrangian extrapolation (MAPLE) (Bellon et al., 2010), Nowprecip (Sideris et al., 2018).

A weather radar center provides the precipitation forecast fields to the corresponding industry using the area based precipitation forecasting technique, for example, MAPLE, to support the very-short term forecast and warning task. MAPLE calculates motion vectors of precipitation fields using the calculus of variations, and forecasts future precipitation fields until next 6 hr using quasi-Lagrangian extrapolation.

However, MAPLE fails to reflect the precipitation development and dissipation effect, and due to the use of a single precipitation motion vector field, there is a limitation in forecasting the precipitation fields that change nonlinearly. In particular, to improve the nowcasting capability for precipitation in hazardous weather phenomena locally occurring in summer, it is necessary to reflect the motion vector fields that dynamically change and the development and dissipation effect of the precipitation systems.

SUMMARY

In view of this circumstance, the present disclosure is directed to providing a precipitation nowcasting method using dynamic motion vectors that change depending on the forecast time.

The present disclosure is further directed to providing a recording medium having recorded thereon a computer program for performing the precipitation nowcasting method using dynamic motion vectors.

The present disclosure is further directed to providing a device for performing the precipitation nowcasting method using dynamic motion vectors.

A precipitation nowcasting method using dynamic motion vectors according to an embodiment for achieving the above-described object of the present disclosure includes calculating a multiscale motion vector of a radar precipitation motion vector and a numerical model precipitation motion vector by changing spatial scale of cross correlation analysis at a preset time interval from precipitation data through dual polarization radar, calculating a dynamic motion vector by merging the radar precipitation motion vector and the numerical model precipitation motion vector, generating a precipitation development and dissipation map through precipitation tracking and matching using the dynamic motion vector, and outputting a precipitation forecast field for each forecast time by applying the dynamic motion vector and the precipitation development and dissipation map to Lagrangian backward extrapolation.

In an embodiment of the present disclosure, calculating the multiscale motion vector of the radar precipitation motion vector and the numerical model precipitation motion vector may further include correcting each of the radar precipitation motion vector and the numerical model precipitation motion vector using calculus of variations.

In an embodiment of the present disclosure, calculating the dynamic motion vector by merging the radar precipitation motion vector and the numerical model precipitation motion vector may include calculating the dynamic motion vector by time-weighted averaging the radar precipitation motion vector and the numerical model precipitation motion vector.

In an embodiment of the present disclosure, generating the precipitation development and dissipation map through precipitation tracking and matching using the dynamic motion vector may include calculating an increase/decrease rate of precipitation for each grid using a radar precipitation field nearest temporally to the radar precipitation motion vector, and calculating an average increase/decrease rate of precipitation at a preset time interval from the increase/decrease rate of precipitation for each grid of the radar precipitation field.

In an embodiment of the present disclosure, generating the precipitation development and dissipation map through precipitation tracking and matching using the dynamic motion vector may further include calculating an increase/decrease rate of precipitation for each grid using a numerical model precipitation field nearest temporally to the numerical model precipitation motion vector, and calculating an average increase/decrease rate of precipitation at a preset time interval from the increase/decrease rate of precipitation for each grid of the numerical model precipitation field.

In an embodiment of the present disclosure, generating the precipitation development and dissipation map through precipitation tracking and matching using the dynamic motion vector may further include merging the average increase/decrease rate of precipitation of the radar precipitation field and the average increase/decrease rate of precipitation of the numerical model precipitation field.

In an embodiment of the present disclosure, generating the precipitation development and dissipation map through precipitation tracking and matching using the dynamic motion vector may include generating an average increase/decrease distribution of precipitation in two dimensions by repeating in all pixels of the radar precipitation field and the numerical model precipitation field.

A computer-readable storage medium according to an embodiment for achieving another object of the present disclosure has recorded thereon a computer program for performing the precipitation nowcasting method using dynamic motion vectors.

A precipitation nowcasting device using dynamic motion vectors according to an embodiment for achieving still another object of the present disclosure includes a multiscale motion vector unit to calculate a multiscale motion vector of a radar precipitation motion vector and a numerical model precipitation motion vector by changing spatial scale of cross correlation analysis at a preset time interval from precipitation data through dual polarization radar, a motion vector merging unit to calculate a dynamic motion vector by merging the radar precipitation motion vector and the numerical model precipitation motion vector, a precipitation map generation unit to generate a precipitation development and dissipation map through precipitation tracking and matching using the dynamic motion vector, and a precipitation forecast field output unit to output a precipitation forecast field for each forecast time by applying the dynamic motion vector and the precipitation development and dissipation map to Lagrangian backward extrapolation.

In an embodiment of the present disclosure, the multiscale motion vector unit may correct each of the radar precipitation motion vector and the numerical model precipitation motion vector using calculus of variations.

In an embodiment of the present disclosure, the motion vector merging unit may calculate the dynamic motion vector by time-weighted averaging the radar precipitation motion vector and the numerical model precipitation motion vector.

In an embodiment of the present disclosure, the precipitation map generation unit may include a Hydro Surface Rainfall (HSR) unit to calculate an increase/decrease rate of precipitation for each grid using a radar precipitation field nearest temporally to the radar precipitation motion vector and calculate an average increase/decrease rate of precipitation at a preset time interval from the increase/decrease rate of precipitation for each grid of the radar precipitation field, a Korea Local Analysis and Prediction System (KLAPS) unit to calculate an increase/decrease rate of precipitation for each grid using a numerical model precipitation field nearest temporally to the numerical model precipitation motion vector and calculate an average increase/decrease rate of precipitation at a preset time interval from the increase/decrease rate of precipitation for each grid of the numerical model precipitation field, and a map merging unit to merge the average increase/decrease rate of precipitation of the radar precipitation field and the average increase/decrease rate of precipitation of the numerical model precipitation field.

In an embodiment of the present disclosure, the precipitation map generation unit may generate an average increase/decrease distribution of precipitation in two dimensions by repeating in all pixels of the radar precipitation field and the numerical model precipitation field.

According to the precipitation nowcasting method using dynamic motion vectors, it is possible to achieve realistic precipitation forecast field simulation by reflecting the motion of the precipitation systems by scale and time-dependent discontinuous motion characteristics on quasi-Lagrangian precipitation forecasts. Additionally, it is possible to achieve realistic precipitation forecast field simulation by reflecting the development and dissipation effect of the precipitation systems on precipitation forecasts, thereby giving enough lead time of hazardous weather forecasts and improving the precipitation nowcasting performance.

DETAILED DESCRIPTION OF EMBODIMENTS

Figure 1:
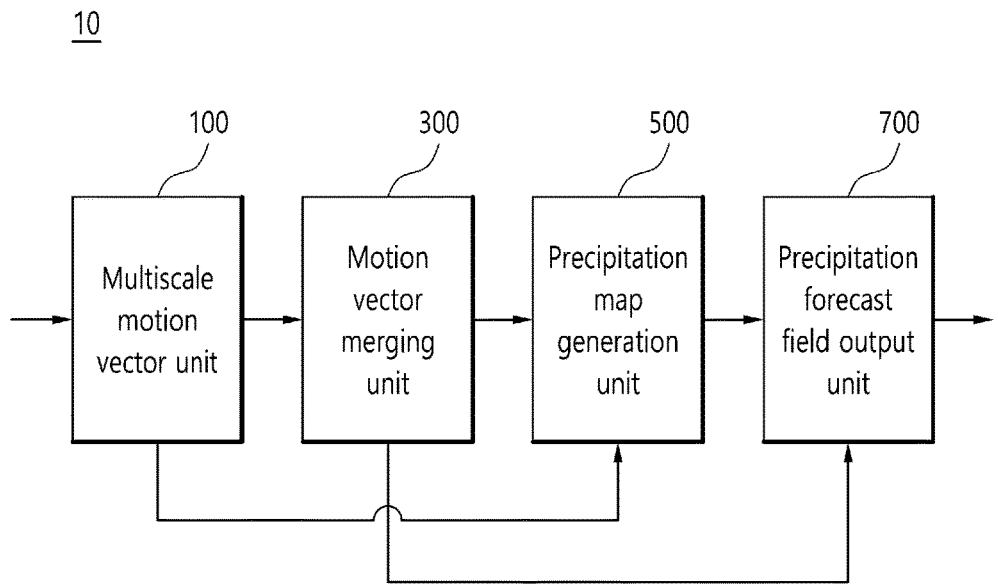
FIG. 1 is a block diagram of a precipitation nowcasting device using dynamic motion vectors according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, the preferred embodiments of the present disclosure will be described in more detail with reference to the accompanying drawings.

FIG. 1 is a block diagram of a precipitation nowcasting device using dynamic motion vectors according to an embodiment of the present disclosure.

The precipitation nowcasting device 10 using dynamic motion vectors (hereinafter, device) according to the present disclosure calculates dynamic motion vectors that change depending on the forecast time, and generates a precipitation development and dissipation map using the calculated dynamic motion vectors for realistic precipitation forecast field simulation.

To apply the dynamic motion vectors and the precipitation development and dissipation map to the nowcasting technique, it is necessary to calculate a large number of motion vector fields in a sequential order, and cross correlation analysis based nowcasting technique that is relatively easy to calculate precipitation motion vectors is applied.

The proposed precipitation nowcasting technique may be largely divided into four stages. In the first stage, precipitation motion vectors are calculated by applying cross correlation analysis to each of Hydro Surface Rainfall (HSR) precipitation field (present to −60 min, at 10 min intervals) and Korea Local Analysis and Prediction System (KLAPS) forecast precipitation field (present to 6 hr, at 10 min intervals).

In the second stage, dynamic motion vectors are calculated by merging HSR nowcasting precipitation motion vectors and KLAPS precipitation motion vectors. In the third stage, a precipitation development and dissipation field is calculated using the HSR and KLAPS precipitation motion vectors. In the final fourth stage, a precipitation forecast field is calculated by the backward quasi-Lagrangian method using the precipitation motion vectors updated at 10 min intervals, and in this instance, the forecast field is corrected by reflecting the precipitation development and dissipation effect.

Referring to FIG. 1, the device 10 according to the present disclosure includes a multiscale motion vector unit 100, a motion vector merging unit 300, a precipitation map generation unit 500 and a precipitation forecast field output unit 700.

The device 10 of the present disclosure may run software (application) for precipitation nowcasting using dynamic motion vectors installed thereon, and the multiscale motion vector unit 100, the motion vector merging unit 300, the precipitation map generation unit 500 and the precipitation forecast field output unit 700 may be controlled by the software for precipitation nowcasting using dynamic motion vectors, run on the device 10.

The device 10 may be a separate terminal from weather radar or modules of the terminal. Additionally, the multiscale motion vector unit 100, the motion vector merging unit 300, the precipitation map generation unit 500 and the precipitation forecast field output unit 700 may be formed as an integrated module or at least one module. However, to the contrary, each element may be formed as a separate module.

The device 10 may be in the form of a server or an engine, and may be mobile or fixed. The device 10 may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The multiscale motion vector unit 100 calculates multiscale motion vectors of radar precipitation motion vectors and numerical model precipitation motion vectors by changing the spatial scale of cross correlation analysis at a preset time interval from precipitation data through dual polarization radar.

Figure 2:
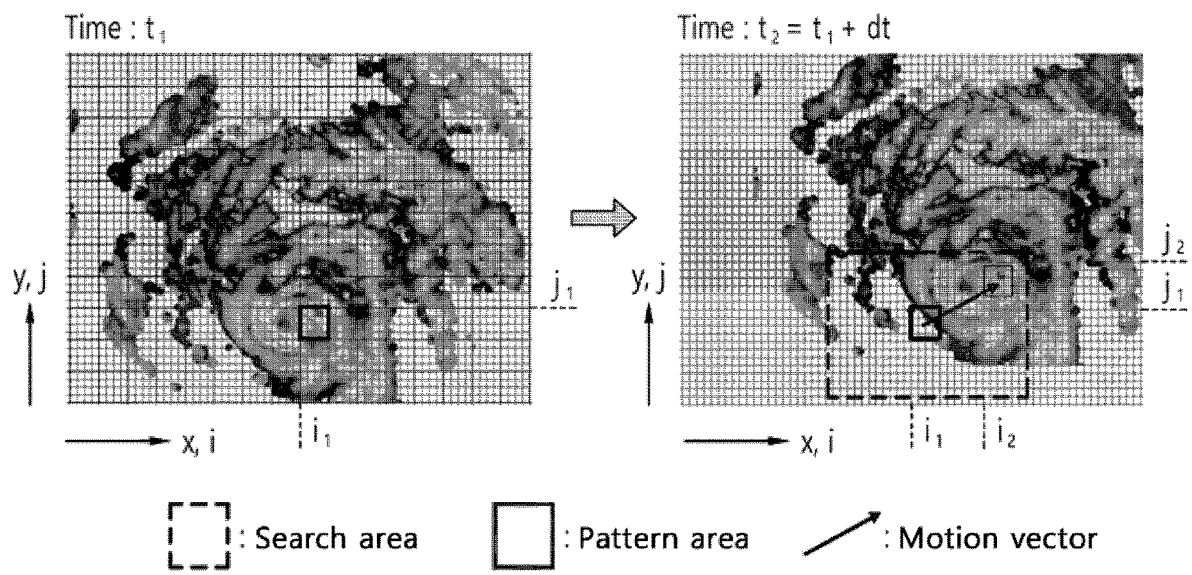
FIG. 2 is a diagram showing an example of calculating precipitation motion vectors using a cross correlation method by a multiscale motion vector unit of FIG. 1.

The precipitation motion vectors are calculated through precipitation pattern matching using the cross correlation method. To calculate the precipitation motion vectors, two (t1, t2) precipitation fields at adjacent times (dt: 10 min) are necessary as shown in FIG. 2. An area in the search area (a dotted line box) at t2 that best matches precipitation in a pattern area (a solid line box) at t1 is determined as an area having the highest correlation coefficient of the following Equation 1, and as shown in the following Equation 2, the speed calculated using the movement distance of the pattern area at the adjacent times is defined as the motion vector.

$$r = \frac{\sum_{i=1}^{n}(a_1-\bar{a})(b_i-\bar{b})}{\sqrt{\sum_{i=1}^{n}(a_1-\bar{a})^2}\sqrt{\sum_{i=1}^{n}(b_i-\bar{b})^2}} \quad \text{[Equation 1]}$$

$$\frac{dx}{dt} = \frac{i_2-i_1}{dt}, \frac{dy}{dt} = \frac{j_2-j_1}{dt} \quad \text{[Equation 2]}$$

In an embodiment, the motion vectors are calculated by precipitation scale by setting the pattern area to 20×20 km, 40×40 km, 80×80 km and 160×160 km to reflect the motion of a variety of scales of precipitation. The motion vectors by scale are calculated as one motion vector through weighted averaging.

Finally, to calculate spatially continuous motion vectors, the motion vectors are corrected using the calculus of variations. The calculus of variations is a method for optimization of a function value of an objective function, and the key is to find a parameter that minimizes the function value. In the present disclosure, the objective function is a cost function J of the following Equation 3, and the cost function includes a continuity equation of the following Equation 4 and a Laplacian filter constraint term of Equation 5.

$$J = \sum_{M=1}^{2} J_M \quad \text{[Equation 3]}$$

$$J_1 = \sum_{x,y} \alpha_1 \left\{ \frac{\partial u}{\partial x} + \frac{\partial v}{\partial y} \right\}^2 \quad \text{[Equation 4]}$$

$$J_2 = \sum_{x,y} \alpha_2 [\nabla^2 (u+v)]^2 \quad \text{[Equation 5]}$$

Here, α is a weighting factor. The parameters are u and v which are motion vectors to be corrected. That is, finding motion vectors satisfying the continuity equation and the Laplacian filter is the main factor of correction.

The motion vector merging unit 300 calculates dynamic motion vectors by merging the radar precipitation motion vectors and the numerical model precipitation motion vectors.

Precipitation accompanying dangerous weather such as monsoon and typhoons moves nonlinearly over time. To reflect the motion of precipitation on the nowcasting technique, it is necessary to update the precipitation motion vectors depending on the forecast time. The present disclosure proposes a method of updating the motion vectors depending on the forecast time using the numerical model precipitation forecast field as shown in FIG. 3.

Figure 3:
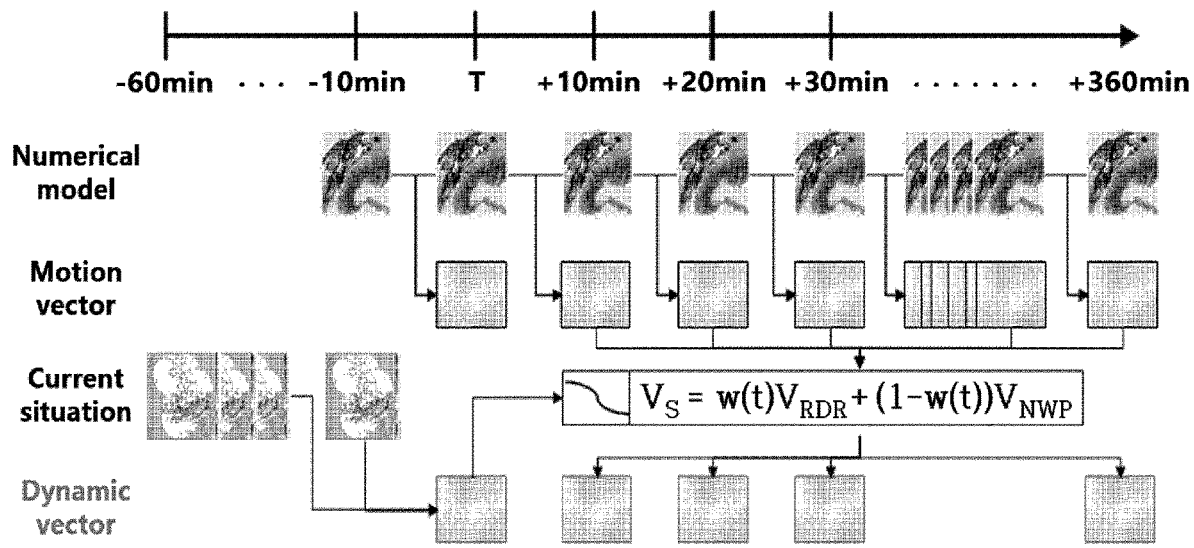
FIG. 3 is a diagram showing an example of calculating dynamic motion vectors by merging numerical model precipitation forecast field motion vectors and precipitation nowcasting field motion vectors by a motion vector merging unit of FIG. 1.

Referring to FIG. 3, numerical model motion vectors are calculated at 10 min intervals using the precipitation field forecast until next 6 hr at 10 min intervals, and nowcasting precipitation motion vectors are calculated using the radar precipitation field.

Finally, dynamic motion vectors are calculated by merging the radar precipitation motion vectors and the numerical model precipitation motion vectors using the hyperbolic tangent function over time as shown in the following Equation 6. Here, α is a coefficient of the function, and t is the time.

$$w(t) = \frac{1}{1+\exp(a \times t)} \quad \text{[Equation 6]}$$

The precipitation map generation unit 500 generates a precipitation development and dissipation map through precipitation tracking and matching using the dynamic motion vectors.

Development and dissipation of precipitation occur due to a variety of kinetic/thermodynamic factors, and a statistical model is difficult to reflect a physically complex mechanism such as development and dissipation of precipitation. Accordingly, as the forecast time is longer, the nowcasting performance sharply reduces compared to the numerical model forecasting performance.

To overcome the limitation of the nowcasting technique, the weather radar center adopts the weighted averaging of the numerical model forecast field and the nowcasting model forecast field depending on the forecast time. This method increases the weight of the numerical model forecast field as the forecast time is longer.

Figure 4:
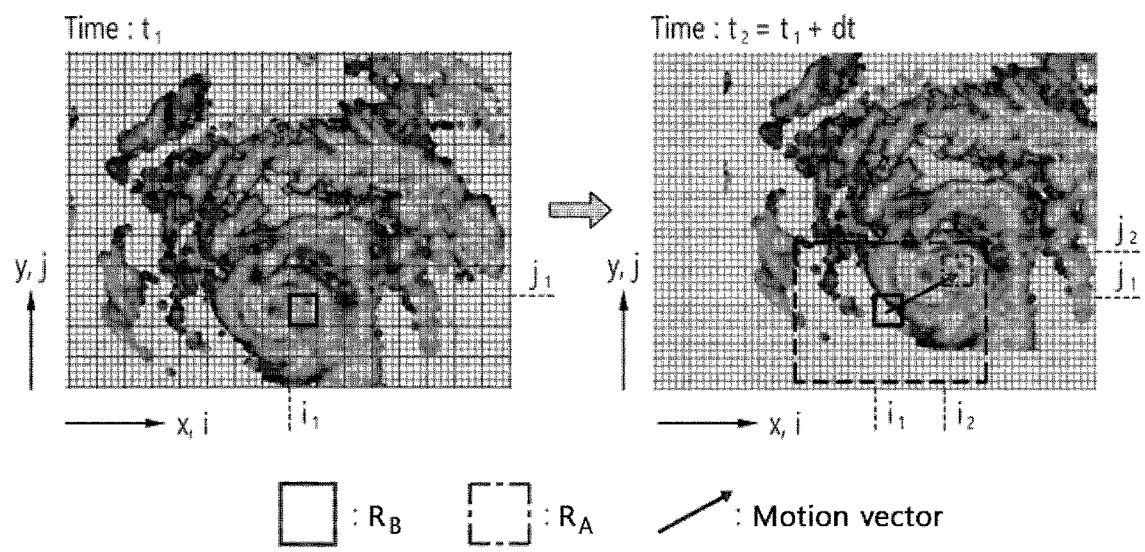
FIG. 4 is a diagram showing an example of tracking precipitation pixels and calculating a precipitation increase/decrease rate using dynamic motion vectors by a precipitation map generation unit of FIG. 1.

The present disclosure proposes a method of extracting the increasing/decreasing tendency of precipitation included in the numerical model forecast field and the radar precipitation field as shown in FIG. 4, rather than directly reflecting the numerical model forecast field.

Referring to FIG. 4, precipitation pixels are tracked and matched ($R_B \rightarrow R_A$) using precipitation motion vectors in two precipitation fields at adjacent times t1, t2, and an increase/decrease in precipitation is calculated from a rainfall intensity difference of the matched pixels.

This process is repeated in all the pixels and the precipitation fields (HSR precipitation field, KLAPS forecast precipitation field) to generate an average increase/decrease distribution of precipitation in two dimensions. The calculated increase/decrease distribution of precipitation is applied to the nowcasting technique as a precipitation development and dissipation map, and is represented as the following Equation 7.

$$I_A = \frac{1}{n} \sum_{t=0}^{n} \Delta R_{A,t}, \Delta R_{A,t} = R_B - R_A \quad \text{[Equation 7]}$$

The precipitation forecast field output unit 700 outputs the precipitation forecast field for each forecast time by applying the dynamic motion vectors and the precipitation development and dissipation map to Lagrangian backward extrapolation.

The precipitation forecasting applies the motion vectors to the quasi-Lagrangian backward extrapolation method proposed by Germann and Zawadzki (2002) as shown in the following Equations 8 and 9.

$$\tau = N\Delta t \quad \text{[Equation 8]}$$

$$\alpha = \Delta t u\left(t_0, x - \frac{\alpha}{2}\right) \quad \text{[Equation 9]}$$

Here, $\tau$ is the total forecast period, and $\Delta t$ is the forecast time interval. $\alpha$ is the precipitation movement distance, and u is the precipitation motion vector. The present disclosure involves tracking of the past location based on the motion vector of the current location and advection of precipitation of that location to the current location.

To validate the performance of the proposed precipitation nowcasting technique, it is applied to the case of thirteenth Typhoon Lingling that has passed over the Korean Peninsula in 2019 (Sep. 7, 2019, at 12:00 KST). The performance analysis of the precipitation nowcasting technique is based on an extreme case such as typhoon having a large temporal/spatial change in the precipitation area.

Figure 5:
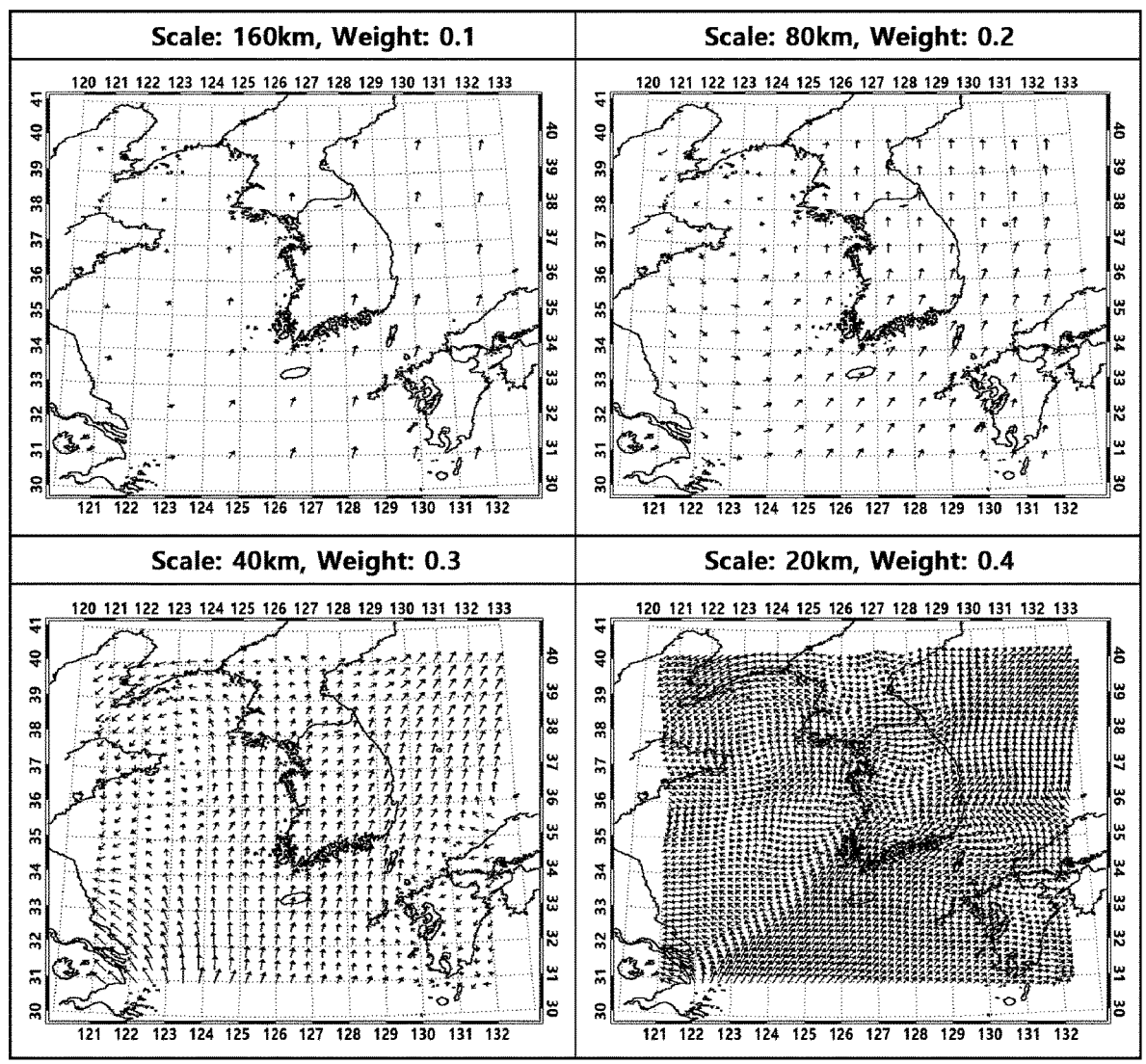
FIG. 5 is a diagram showing a result of calculating precipitation motion vectors by spatial scale according to the present disclosure.

First, to validate the accuracy of the multiscale motion vectors, the window of cross correlation analysis is divided by spatial scale, and motion vectors are calculated by spatial scale (20, 40, 80, 160 km) as shown in FIG. 5.

Referring to FIG. 5, as the spatial scale is larger, the motion vectors reflect an average flow of precipitation system, and as the spatial scale is smaller, the motion vectors greatly reflect a local change in precipitation system. In particular, the typhoon's low pressure circulation is clearly found in the spatial scale of 20 km. The motion vectors calculated by scale, of which the weighted average is calculated based on the weight for each scale.

Figure 6:
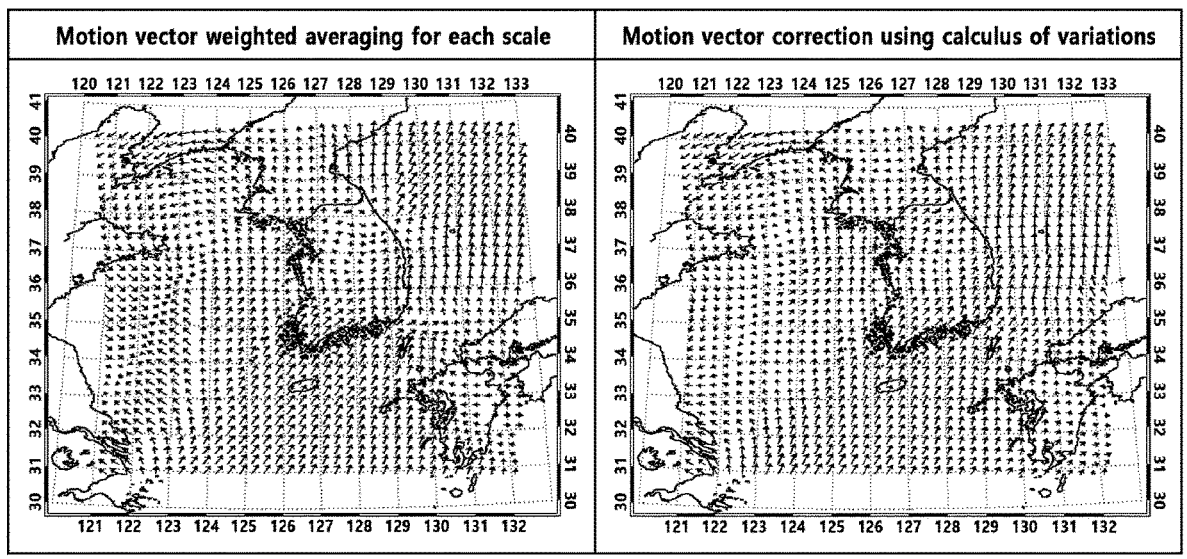
FIG. 6 is a diagram showing motion vectors obtained by weight averaging the motion vectors of FIG. 5 by scale and motion vectors corrected by the calculus of variations.

The average motion vectors are corrected according to the cost function constraint term (smoothing of the continuity equation) using the calculus of variations as shown in FIG. 6. Referring to FIG. 6, the motion vectors before correction exhibit a discontinuous distribution like the motion vectors on the inland areas and the western coast of the Korean Peninsula. The motion vectors corrected using the calculus of variations have the reduced spatial discontinuity and reflects the typhoon's low pressure circulation well.

Figure 7:
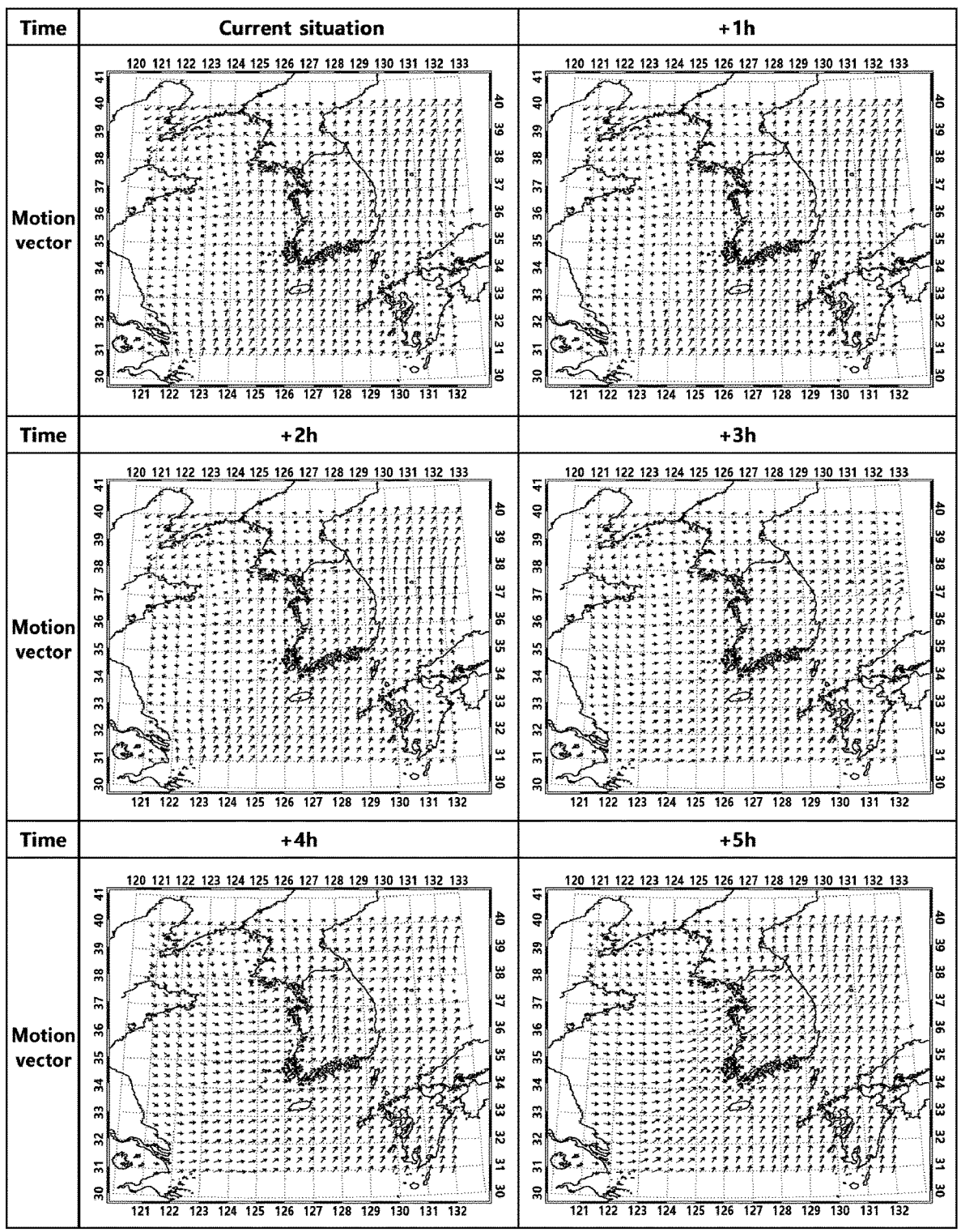
FIG. 7 is a diagram showing a result of calculating dynamic motion vectors for each forecast time using the motion vectors of FIG. 6.

The center of the typhoon's circulation found in the dynamic motion vectors moves northeast as the forecast time is longer as shown in FIG. 7, and the low pressure circulation gradually weakens. Accordingly, it can be seen that the dynamic motion vectors significantly reflect not only the typhoon's low pressure circulation but also the average flow of precipitation motion over time.

Meanwhile, in validating the HSR and KLAPS based precipitation development and dissipation maps, the HSR based development and dissipation map greatly reflects the dissipation rate of precipitation along the upwind side of the Taebaek Mountains. When the precipitation field goes northeast and passes over the Taebaek Mountains, it reflects the tendency of precipitation to gradually weaken by the tomographic effect.

Additionally, there is a high distribution of dissipation rate in the inland areas and areas at the edge of weak precipitation, which reflects the decreasing tendency of the rainfall intensity and the tendency of weak precipitation to dissipate as the typhoon enters the inland areas.

A similar increase/decrease distribution of precipitation is found in the development and dissipation map of KLAPS. The present disclosure may reflect the increase/decrease effect of precipitation in the broader range by merging the development and dissipation maps of HSR and KLAPS.

Additionally, the new precipitation forecast field reflecting the dynamic motion vectors and the development and dissipation of precipitation is compared with McGil algorithm for precipitation nowcasting by Lagrangian extrapolation (MAPLE) forecast field. In 1 hr forecast field, the new forecast field weakens the weak precipitation at the western edge of the typhoon by the precipitation development and dissipation effect, and weakens the weak precipitation band moving northeast over the upwind side of the Taebaek Mountains, reflecting the tomographic effect. The new forecast field is more similar to nowcasting than MAPLE forecast field not reflecting the precipitation development and dissipation effect.

Subsequently, as the forecast time goes by, the new forecast field gradually expands the area in which precipitation weakens and dissipates along the western edge of the typhoon, and likewise, the nowcast precipitation field also weakens along the western edge of the typhoon. In contrast, MAPLE produces still strong forecasts in the western area of the typhoon, and has morphological deformation in the precipitation distribution extending in the east-west direction with respect to the capital region.

It is caused by the discontinuous distribution of MAPLE motion vectors. It is because the magnitude of the motion vectors sharply changes in the east-west direction with respect to the capital region, and the MAPLE forecast field has no motion in the inland areas due to the under simulated motion vectors. The new forecast field does not have morphological deformation as in MAPLE, and as opposed to MAPLE forecast field stagnant in the inland areas, gradually weakens in the northeast direction over the Taebaek Mountains in the similar way to nowcasting.

Additionally, it forecasts the typhoon's northeast motion with the low pressure circulation in the similar way to nowcasting, and this is because the dynamic motion vectors reflect a nonlinear motion such as the typhoon well.

The present disclosure derives more similar results to nowcasting than MAPLE in the nonlinearly moving hazardous weather case such as the typhoon by applying the dynamic motion vectors and the development and dissipation effect of precipitation to the precipitation nowcasting technique. The dynamic motion vectors induce the realistic motion of precipitation by changing the local flow and the average flow adapted for nowcasting as the forecast time goes by.

Additionally, the precipitation development and dissipation map produces similar forecasts to nowcasting by extracting the increasing/decreasing tendency of precipitation from the nowcasting precipitation field and the numerical model forecast precipitation field and reflecting the weak precipitation dissipation effect at the edge of the typhoon and the upwind side of the Taebaek Mountains. That is, the forecasting results similar to nowcasting are derived by extracting the changing tendency of the radar nowcasting and the numerical model forecast field and applying to nowcasting, rather than combining with the numerical model forecast field.

Figure 8:
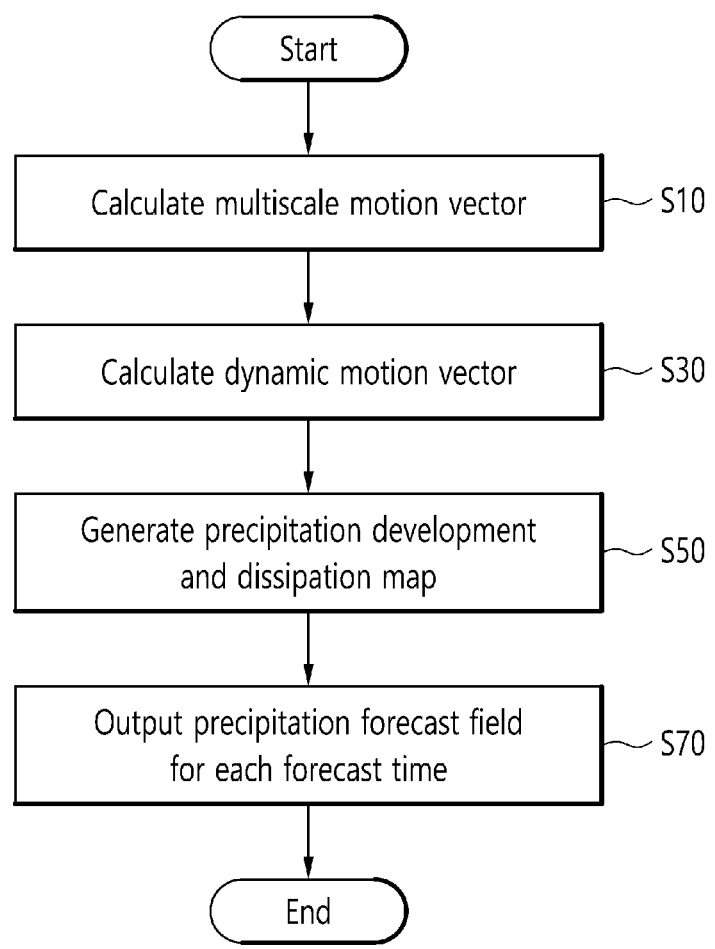
FIG. 8 is a flowchart of a precipitation nowcasting method using dynamic motion vectors according to an embodiment of the present disclosure.
Figure 9:
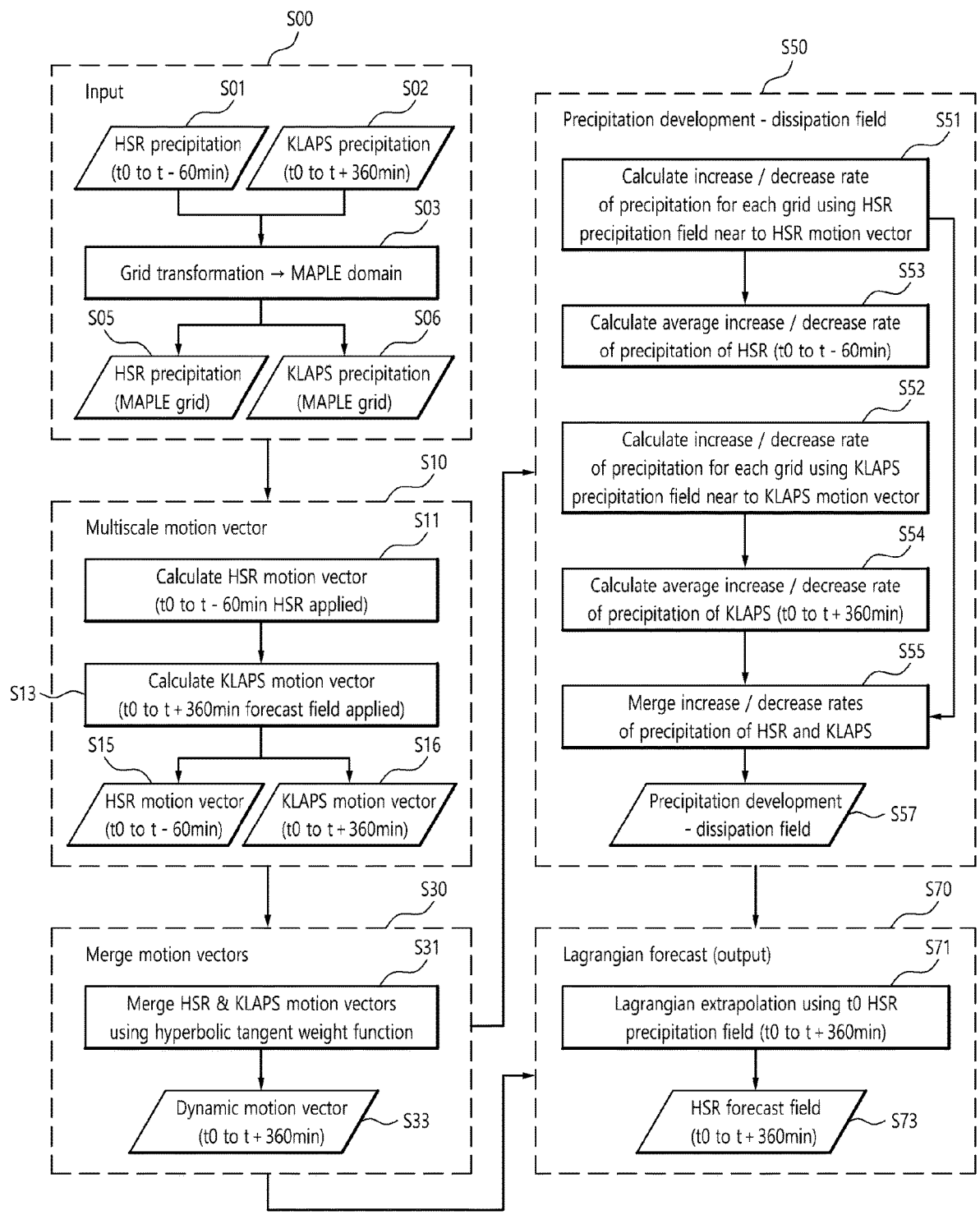
FIG. 9 is a detailed flowchart showing an algorithm of FIG. 8.

FIG. 8 is a flowchart of a precipitation nowcasting method using dynamic motion vectors according to an embodiment of the present disclosure. FIG. 9 is a detailed flowchart showing an algorithm of FIG. 8.

The precipitation nowcasting method using dynamic motion vectors according to this embodiment may be performed in substantially the same configuration as the device 10 of FIG. 1. Accordingly, the same element as the device 10 of FIG. 1 is given the same reference sign, and a repetitive description is omitted herein.

Additionally, the precipitation nowcasting method using dynamic motion vectors according to this embodiment may be performed by software (application) for precipitation nowcasting using dynamic motion vectors.

The present disclosure calculates dynamic motion vectors that change depending on the forecast time, and generates a precipitation development and dissipation map using the calculated dynamic motion vectors for realistic precipitation forecast field simulation.

To apply the dynamic motion vectors and the precipitation development and dissipation map to the nowcasting technique, it is necessary to calculate a large number of motion vector fields in a sequential order, and cross correlation analysis based nowcasting technique that is relatively easy to calculate precipitation motion vectors is applied.

Referring to FIGS. 8 and 9, the precipitation nowcasting method using dynamic motion vectors according to this embodiment calculates multiscale motion vectors of radar precipitation motion vectors and numerical model precipitation motion vectors by changing the spatial scale of cross correlation analysis at a preset time interval from precipitation data through dual polarization radar (S10).

Prior to this, HSR precipitation field and KLAPS forecast precipitation field may be collected (S00).

For example, the HSR precipitation field may be collected at 10 min intervals until next 60 min (S01), and the KLAPS forecast precipitation field may be collected at 10 min intervals until next 6 hr (S02). Through grid transformation (S03), the HSR precipitation field (or referred to as radar precipitation field) and the KLAPS forecast precipitation field (or referred to as numerical model precipitation field) may output HSR precipitation and KLAPS precipitation respectively in the MAPLE domain (S05 and S06).

In the step S10, motion vectors are calculated by precipitation scale by setting the pattern area to, for example, 20×20 km, 40×40 km, 80×80 km, 160×160 km to reflect the motion of a variety of scales of precipitation (S11 and S13).

The motion vectors by scale are calculated into one HSR motion vector and one KLAPS motion vector through weighted averaging (S15 and S16).

Additionally, each of the radar precipitation motion vectors and the numerical model precipitation motion vectors may be corrected using the calculus of variations. Its detailed description was made together with Equations 1 to 5 in the description of the device.

A dynamic motion vector is calculated by merging the radar precipitation motion vector and the numerical model precipitation motion vector (S30).

For example, the numerical model motion vectors are calculated at 10 min intervals using the precipitation field forecast until next 6 hr at 10 min intervals, and the nowcasting precipitation motion vectors are calculated using the radar precipitation field.

Subsequently, the radar precipitation motion vector and the numerical model precipitation motion vector are merged using the hyperbolic tangent function (S31) to calculate one dynamic motion vector (S33, see Equation 6).

A precipitation development and dissipation map is generated through precipitation tracking and matching using the dynamic motion vectors (S50).

To this end, first, an increase/decrease rate of precipitation is calculated for each grid using the radar precipitation field nearest temporally to the radar precipitation motion vector (S51), and an average increase/decrease rate of precipitation is calculated at a preset time interval from the increase/decrease rate of precipitation for each grid of the radar precipitation field (S53).

On the other hand, an increase/decrease rate of precipitation is calculated for each grid using the numerical model precipitation field nearest temporally to the numerical model precipitation motion vector (S52), and an average increase/decrease rate of precipitation is calculated at a preset time interval from the increase/decrease rate of precipitation for each grid of the numerical model precipitation field (S54).

The average increase/decrease rate of precipitation of the radar precipitation field and the average increase/decrease rate of precipitation of the numerical model precipitation field are merged (S55) to complete the precipitation development and dissipation map (S57).

In the step S50, precipitation pixels are tracked and matched using the precipitation motion vectors in two precipitation fields at adjacent times, and an increase/decrease in precipitation is calculated from a rainfall intensity difference of the matched pixels.

This process is repeated in all the pixels and the precipitation fields (HSR precipitation field, KLAPS forecast precipitation field) to generate an average increase/decrease distribution of precipitation in two dimensions. The calculated increase/decrease distribution of precipitation is applied to the nowcasting technique as the precipitation development and dissipation map (see Equation 7).

A precipitation forecast field for each forecast time is outputted by applying the dynamic motion vectors and the precipitation development and dissipation map to Lagrangian backward extrapolation (S70).

By quasi-Lagrangian backward extrapolation using the precipitation motion vectors updated at 10 min intervals (S71, see Equations 8 and 9), the precipitation forecast field for each forecast time is outputted (S73).

The precipitation nowcasting method using dynamic motion vectors may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

The present disclosure can be used to prevent meteorological disasters through early detection of hazardous weather and rapid response using the area based precipitation nowcasting technique. Additionally, it can be advantageously used in the meteorological and disaster prevention service and sluice applications, for example, early response information in the field of water resource management and flood forecast for sluice.

DETAILED DESCRIPTION OF MAIN ELEMENTS

10: Precipitation nowcasting device using dynamic motion vectors
100: Multiscale motion vector unit
300: Motion vector merging unit
500: Precipitation map generation unit
700: Precipitation forecast field output unit

What is claimed is:

1. A precipitation nowcasting method using dynamic motion vectors, the method comprising:
calculating a multiscale motion vector of a radar precipitation motion vector calculated using a radar precipitation field and a numerical model precipitation motion vector calculated using a numerical model precipitation field by changing spatial scale of cross correlation analysis for each of a preset time interval from precipitation data obtained through a dual polarization radar;
calculating a dynamic motion vector by merging the radar precipitation motion vector and the numerical model precipitation motion vector;
generating a precipitation development and dissipation map through precipitation tracking and matching using the dynamic motion vector, wherein the generating comprises calculating an increase/decrease rate of precipitation for each grid of the radar precipitation field nearest temporally to the radar precipitation motion vector, and calculating an average increase/decrease rate of precipitation for the each of the preset time interval from the increase/decrease rate of precipitation for the each grid of the radar precipitation field; and
outputting a precipitation forecast field for each forecast time by applying the dynamic motion vector and the precipitation development and dissipation map to Lagrangian backward extrapolation.

2. The precipitation nowcasting method of claim 1, wherein the calculating the multiscale motion vector of the radar precipitation motion vector and the numerical model precipitation motion vector comprises correcting each of the radar precipitation motion vector and the numerical model precipitation motion vector using calculus of variations.

3. The precipitation nowcasting method of claim 1, wherein the calculating the dynamic motion vector by merging the radar precipitation motion vector and the numerical model precipitation motion vector comprises calculating the dynamic motion vector by time-weighted averaging the radar precipitation motion vector and the numerical model precipitation motion vector.

4. The precipitation nowcasting method of claim 1, wherein the generating the precipitation development and dissipation map through precipitation tracking and matching using the dynamic motion vector further comprises:
calculating an increase/decrease rate of precipitation for each grid of the numerical model precipitation field nearest temporally to the numerical model precipitation motion vector; and
calculating an average increase/decrease rate of precipitation for the each of the preset time interval from the increase/decrease rate of precipitation for the each grid of the numerical model precipitation field.

5. The precipitation nowcasting method of claim 4, wherein the generating the precipitation development and dissipation map through precipitation tracking and matching using the dynamic motion vector further comprises merging the average increase/decrease rate of precipitation of the radar precipitation field and the average increase/decrease rate of precipitation of the numerical model precipitation field.

6. The precipitation nowcasting method of claim 5, wherein the generating the precipitation development and dissipation map through precipitation tracking and matching using the dynamic motion vector further comprises generating an average increase/decrease distribution of precipitation in two dimensions by repeating for all pixels of the radar precipitation field and the numerical model precipitation field.

7. A non-transitory computer-readable storage medium having recorded thereon a computer program for performing a precipitation nowcasting method using dynamic motion vector, wherein the method comprises:
calculating a multiscale motion vector of a radar precipitation motion vector calculated using a radar precipitation field and a numerical model precipitation motion vector calculated using a numerical model precipitation field by changing spatial scale of cross correlation analysis for each of a preset time interval from precipitation data obtained through a dual polarization radar;
calculating a dynamic motion vector by merging the radar precipitation motion vector and the numerical model precipitation motion vector;
generating a precipitation development and dissipation map through precipitation tracking and matching using the dynamic motion vector, wherein the generating comprises calculating an increase/decrease rate of precipitation for each grid of the radar precipitation field nearest temporally to the radar precipitation motion vector, calculating an average increase/decrease rate of precipitation for the each of the preset time interval from the increase/decrease rate of precipitation for the each grid of the radar precipitation field; and
outputting a precipitation forecast field for each forecast time by applying the dynamic motion vector and the precipitation development and dissipation map to Lagrangian backward extrapolation.

8. A precipitation nowcasting device using dynamic motion vectors, the device comprising:
a multiscale motion vector unit calculating a multiscale motion vector of a radar precipitation motion vector calculated using a radar precipitation field and a numerical model precipitation motion vector calculated using a numerical model precipitation field by changing spatial scale of cross correlation analysis for each of a preset time interval from precipitation data obtained through a dual polarization radar;

a motion vector merging unit calculating a dynamic motion vector by merging the radar precipitation motion vector and the numerical model precipitation motion vector;

a precipitation map generation unit generating a precipitation development and dissipation map through precipitation tracking and matching using the dynamic motion vector, wherein the precipitation map generation unit comprises a Hydro Surface Rainfall (HSR) unit calculating an increase/decrease rate of precipitation for each grid of the radar precipitation field nearest temporally to the radar precipitation motion vector, and calculating an average increase/decrease rate of precipitation for the each of the preset time interval from the increase/decrease rate of precipitation for the each grid of the radar precipitation field, a Korea Local Analysis and Prediction System (KLAPS) unit calculating an increase/decrease rate of precipitation for each grid of the numerical model precipitation field nearest temporally to the numerical model precipitation motion vector, and calculating an average increase/decrease rate of precipitation for the each of the preset time interval from the increase/decrease rate of precipitation for the each grid of the numerical model precipitation field, and a map merging unit merging the average increase/decrease rate of precipitation of the radar precipitation field and the average increase/decrease rate of precipitation of the numerical model precipitation field; and a precipitation forecast field output unit outputting a precipitation forecast field for each forecast time by applying the dynamic motion vector and the precipitation development and dissipation map to Lagrangian backward extrapolation.

9. The precipitation nowcasting device of claim 8, wherein the multiscale motion vector unit corrects each of the radar precipitation motion vector and the numerical model precipitation motion vector using calculus of variations.

10. The precipitation nowcasting device of claim 8, wherein the motion vector merging unit calculates the dynamic motion vector by time-weighted averaging the radar precipitation motion vector and the numerical model precipitation motion vector.

11. The precipitation nowcasting device of claim 8, wherein the precipitation map generation unit generates an average increase/decrease distribution of precipitation in two dimensions by repeating for all pixels of the radar precipitation field and the numerical model precipitation field.

* * * * *